(12) United States Patent
Dellock et al.

(10) Patent No.: US 10,795,068 B1
(45) Date of Patent: Oct. 6, 2020

(54) VEHICLE BADGE

(71) Applicant: Ford Global Technologies, LLC, Dearborn, MI (US)

(72) Inventors: Paul Kenneth Dellock, Northville, MI (US); Stuart C. Salter, White Lake, MI (US); Joseph Myszka, Livonia, MI (US); Mandeep Singh Sidhu, Canton, MI (US); Daniel Steven Zilinskas, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/445,780

(22) Filed: Jun. 19, 2019

(51) Int. Cl.
| F21V 8/00 | (2006.01) |
| B60R 13/00 | (2006.01) |
| F21V 23/00 | (2015.01) |

(52) U.S. Cl.
CPC .......... *G02B 6/0008* (2013.01); *B60R 13/005* (2013.01); *F21V 23/003* (2013.01)

(58) Field of Classification Search
CPC .... G02B 6/0008; B60R 13/005; F21V 23/003
See application file for complete search history.

(56) References Cited

U.S. PATENT DOCUMENTS

| 6,729,738 | B2 | 5/2004 | Fuwausa et al. |
| 6,773,129 | B2 | 8/2004 | Anderson, Jr. et al. |
| 6,871,986 | B2 | 3/2005 | Yamanaka et al. |
| 6,990,922 | B2 | 1/2006 | Ichikawa et al. |
| 7,079,042 | B2 | 7/2006 | Reim |
| 7,753,541 | B2 | 7/2010 | Chen et al. |
| 7,834,548 | B2 | 11/2010 | Jousse et al. |
| 8,016,465 | B2 | 9/2011 | Egerer et al. |
| 8,203,260 | B2 | 6/2012 | Li et al. |
| 8,408,766 | B2 | 4/2013 | Wilson et al. |
| 9,656,598 | B1* | 5/2017 | Salter .................... F21K 9/64 |
| 10,081,295 | B2 | 9/2018 | Dellock et al. |
| 10,168,039 | B2* | 1/2019 | Dellock ................. F21S 43/19 |
| 2003/0179548 | A1 | 9/2003 | Becker et al. |
| 2009/0219730 | A1 | 9/2009 | Syfert et al. |
| 2010/0103694 | A1* | 4/2010 | Saxena ............... G02B 6/0008 362/554 |
| 2013/0335994 | A1 | 12/2013 | Mulder et al. |

(Continued)

FOREIGN PATENT DOCUMENTS

| CN | 202175002 U | 3/2012 |
| CN | 202491758 U | 10/2012 |

(Continued)

*Primary Examiner* — Donald L Raleigh
(74) *Attorney, Agent, or Firm* — David Coppiellie; Price Heneveld LLP

(57) ABSTRACT

A vehicle badge includes a base and a circuit board disposed on the base. A plurality of light sources is disposed on the circuit board. The plurality of light sources defines a pattern. A guide member is disposed over the plurality of light sources. The guide member defines a plurality of light guides. A housing has a viewable portion and is disposed over the guide member. The guide member directs light from the plurality of light sources to the housing. A controller is operably coupled to each light source of the plurality of light sources. The controller selectively illuminates each light source of the plurality of light sources.

19 Claims, 6 Drawing Sheets

(56) References Cited

U.S. PATENT DOCUMENTS

| | | |
|---|---|---|
| 2014/0119038 A1 | 5/2014 | Mulder et al. |
| 2014/0266666 A1* | 9/2014 | Habibi |
| 2017/0043709 A1* | 2/2017 | Dellock ............... F21V 23/003 |
| 2017/0259755 A1* | 9/2017 | Salter ....................... F21K 9/64 |

FOREIGN PATENT DOCUMENTS

| | | |
|---|---|---|
| DE | 10319396 A1 | 11/2004 |
| GB | 2497833 A | 6/2013 |

* cited by examiner

US 10,795,068 B1

VEHICLE BADGE

FIELD OF THE DISCLOSURE

The present disclosure generally relates to a vehicle badge. More specifically, the present disclosure relates to a vehicle badge having a plurality of light sources that are sequentially illuminated.

BACKGROUND OF THE DISCLOSURE

Vehicles often have features attached to the vehicle body that indicate the manufacturer of the vehicle, such as, words, lettering, or insignia. Additionally, illumination arising from the use of a plurality of light sources offer a unique and attractive viewing experience.

SUMMARY OF THE DISCLOSURE

According to at least one aspect of the present disclosure, a vehicle badge includes a base and a circuit board disposed on the base. A plurality of light sources is disposed on the circuit board. The plurality of light sources defines a pattern. A guide member is disposed over the plurality of light sources. The guide member defines a plurality of light guides. A housing has a viewable portion and is disposed over the guide member. The guide member directs light from the plurality of light sources to the housing. A controller is operably coupled to each light source of the plurality of light sources. The controller selectively illuminates each light source of the plurality of light sources.

According to another aspect of the present disclosure, a badge for a vehicle includes a base and a printed circuit board disposed on the base. A first plurality of light sources is arranged in a first direction pattern along the printed circuit board. A second plurality of light sources is arranged in a second direction pattern along the printed circuit board. A third plurality of light sources is disposed proximate a peripheral portion of the printed circuit board.

According to another aspect of the present disclosure, a method of assembling a badge for a vehicle includes providing a circuit board and installing a plurality of light sources on the circuit board in a pattern. A guide member is positioned over the plurality of light sources. The guide member defines a plurality of light guides that corresponds with the plurality of light sources. A housing is positioned over the guide member. A controller is programmed to selectively illuminate each light source of the plurality of light sources in a predefined illuminated pattern.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
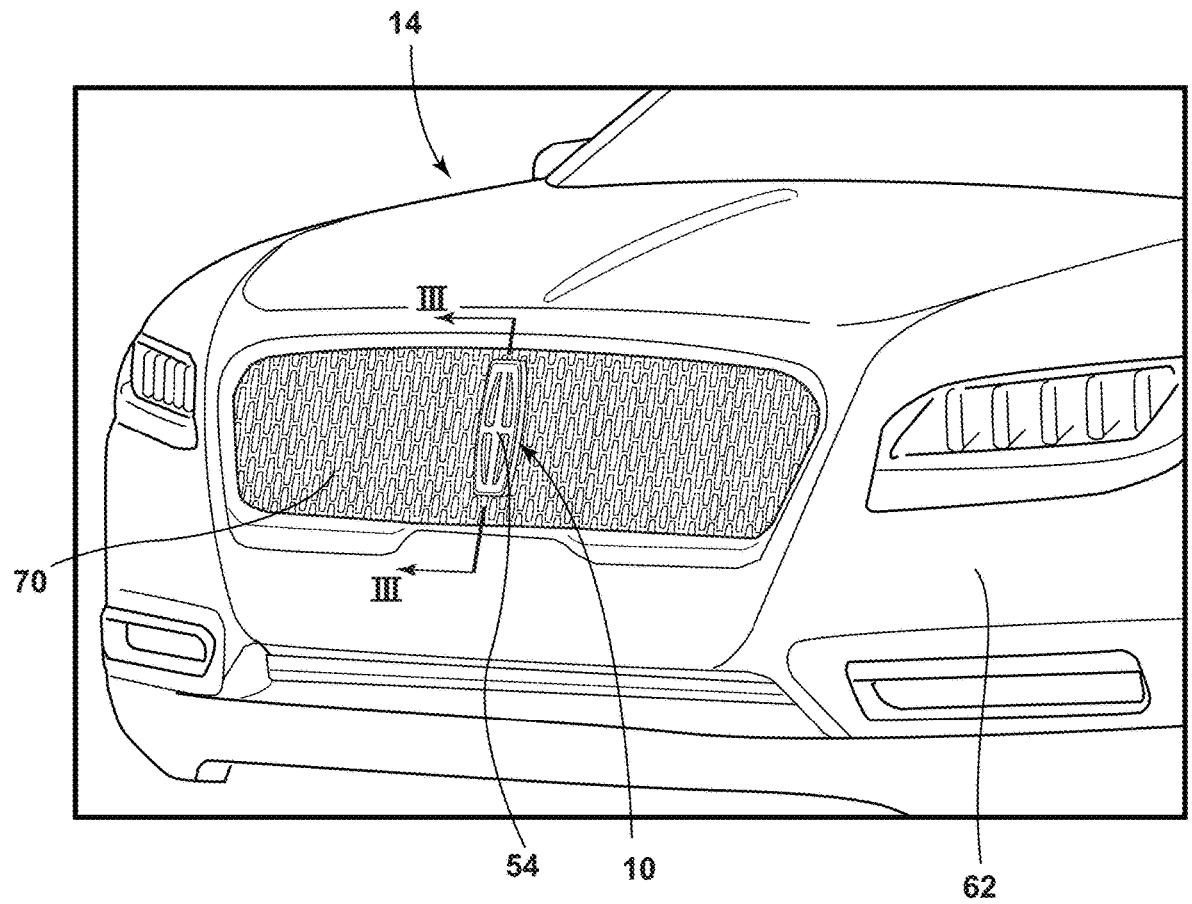
FIG. 1 is a partial front perspective view of a vehicle, according to at least one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-6, reference numeral 10 generally refers to a vehicle badge for a vehicle 14. The vehicle badge 10 includes a base 18 and a circuit board 22 disposed on the base 18. A plurality of light sources 26 is disposed on the circuit board 22. The plurality of light sources 26 includes individual light sources 30. The plurality of light sources 26 defines a pattern 34. A guide member 38 is disposed over the plurality of light sources 26. The guide member 38 defines a plurality of light guides 46. A housing 50 has a viewable portion 54 and is disposed over the guide member 38. The guide member 38 directs light from the plurality of light sources 26 to the housing 50. A controller 58 is operably coupled to each light source 30 of the plurality of light sources 26. The controller 58 selectively illuminates each light source 30 of the plurality of light sources 26.

Referring to FIG. 1, the badge 10 is generally shown mounted on a vehicle-forward portion 62 of the vehicle 14. It is also contemplated that the badge 10 may be located elsewhere, such as, but not limited to, sides of the vehicle 14 or a vehicle-rearward portion of the vehicle 14. The badge 10 may be configured as an insignia that is presented as an identifying mark of a vehicle 14 manufacturer and includes the viewable portion 54 that is generally prominently displayed on the vehicle 14. As illustrated in FIG. 1, the badge 10 is generally centrally located on a grille assembly 70, allowing the badge 10 to be readily viewed by an observer looking head-on at the vehicle 14. The vehicle 14 is a wheeled motor vehicle 14 depicted as a sedan, but may otherwise be a sport utility vehicle, a truck, a van, a crossover, or other style of vehicle 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as ride-providing services (e.g., chauffeuring) and/or ride-sharing services.

Figure 2:
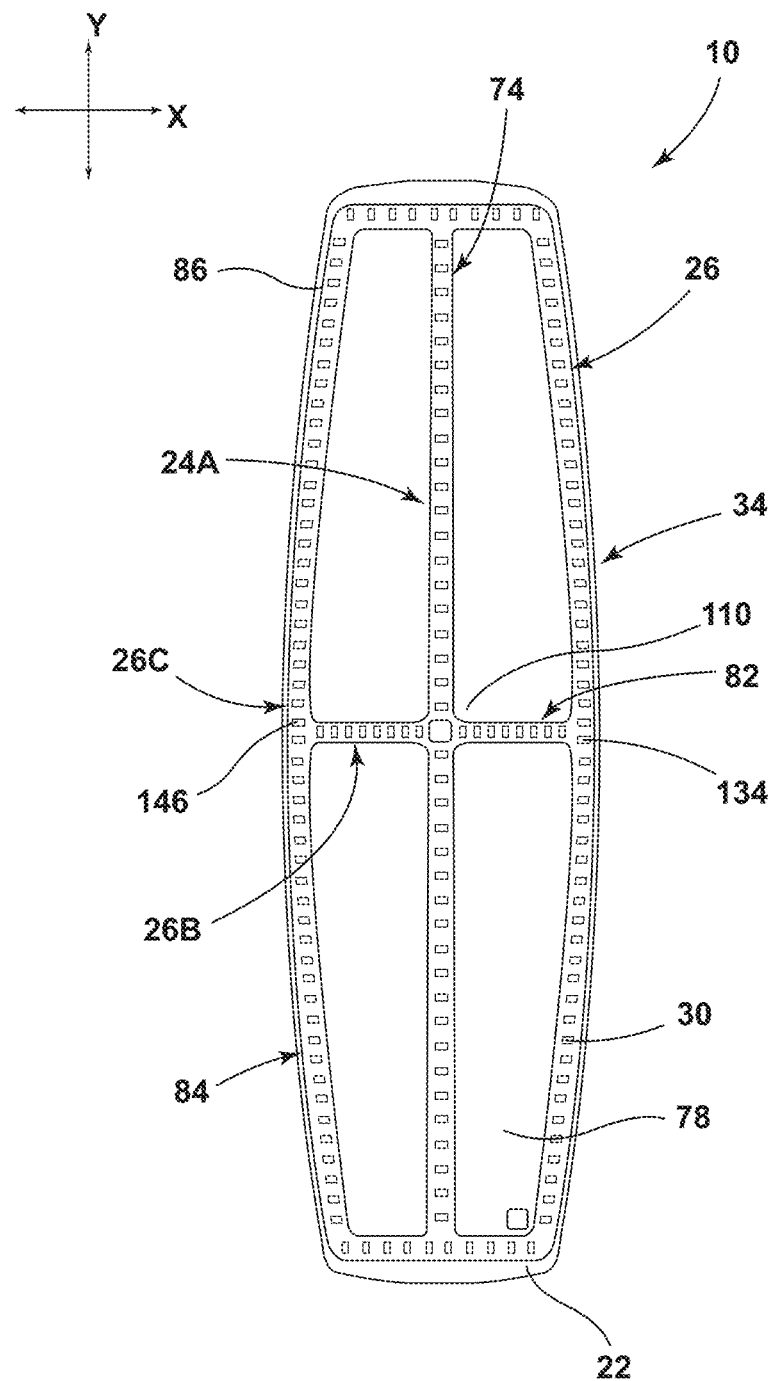
FIG. 2 is a front view of a vehicle badge with a housing removed, according to at least one example.

Referring to FIG. 2, the badge 10 includes the plurality of light sources 26 disposed on the circuit board 22. The plurality of light sources 26 includes the individual light sources 30, which define the pattern 34 on the circuit board 22. The light sources 30 may include any form of light source 30. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the badge 10. Further, various types of LEDs are suitable for use as the light sources 30 including, but not limited to, top-emitting LEDs, side-emitting LEDs, and others. Moreover, according to various examples, multicolored light sources 30, such as Red, Green, and Blue (RGB) LEDs that employ red, green, and blue LED packaging may be used to generate various desired colors of light outputs from a single light source 30, according to known light color mixing techniques. Additionally or alternatively, a variable current may be supplied to the light sources 30 to adjust the degree of illumination emitted therefrom. Any light source 30 disposed within the badge 10 may illuminate in a plurality of colors and/or hues based on the wavelength emitted from the light source 30 and/or the intensity of light emitted therefrom.

The pattern 34 defined by the plurality of light sources 26 may be any arrangement of light sources 30 across the circuit board 22, such as, for example, designs, shapes, repeated designs, words, logos, etc. As illustrated in FIG. 2, the plurality of light sources 26 includes a first plurality of light sources 26A, a second plurality of light sources 26B, and a third plurality of light sources 26C disposed on the circuit board 22 to define the pattern 34. The first plurality of light sources 26A may be arranged in a first direction pattern 74, which may, for example, extend in a longitudinal direction across the circuit board 22. As illustrated, the light sources 30 are arranged in a generally linear pattern, however the light sources 30 may be arranged in other patterns, such as, for example, sinusoidal or zigzag patterns without departing from the teachings herein. The light sources 30 may be disposed along a first axis, such as a y-axis, of a top surface 78 of the circuit board 22, or may otherwise be disposed in any other longitudinally extending first direction pattern 74.

Referring still to FIG. 2, the second plurality of light sources 26B may be arranged in a second direction pattern 82. The second direction pattern 82 may extend laterally across the circuit board 22. Accordingly, the first and second direction patterns 74, 82 may extend in different directions relative to the top surface 78 of the circuit board 22. In various examples, the second direction pattern 82 may extend along a second axis, such as an x-axis, of the top surface 78 of the circuit board 22. As illustrated, the first direction pattern 74 is substantially perpendicular to the second direction pattern 82. However, the first and second direction patterns 74, 82 may extend at any angle relative to one another without departing from the teachings herein. The second plurality of light sources 26B is illustrated in a generally linear pattern. However, other first direction patterns 74, such as, for example, sinusoidal or zigzag patterns are also contemplated without departing from the teachings herein. As illustrated, the generally linear arrangement of the first and second plurality of light sources 26A, 26B intersect to define a substantially "t"-shaped pattern. In such examples, portions of the top surface 78 of the circuit board 22 may not include light sources 30. In this way, an illuminated pattern 132 may be defined by the light sources 30 by illuminating discrete portions of the badge 10. However, it is also contemplated that the first and second pluralities of light sources 26A, 26B may extend across a substantial portion of the top surface 78 of the circuit board 22 to provide additional illumination.

The third plurality of light sources 26C may further contribute to the pattern 34 on the circuit board 22 by defining a peripheral pattern 84 on the top surface 78 of the circuit board 22. In various examples, the third plurality of light sources 26C is disposed along a peripheral portion 86 of the circuit board 22, and therefore may extend around the peripheral portion 86 of the badge 10. The third plurality of light sources 26 may extend around all or part of the perimeter of the circuit board 22 and/or badge 10. As illustrated in FIG. 2, the light sources 30 of the third plurality of light sources 26C are arranged around the entire perimeter of the circuit board 22, such that the light sources 30 form an oblong peripheral pattern 84.

Referring still to FIG. 2 each of the first, second, and third pluralities of light sources 26A, 26B, 26C are illustrated as singular rows of light sources 30. However, additional rows of light sources 30 may be included to provide for additional illumination. In various examples, the first, second, and third pluralities of light sources 26A, 26B, 26C are arranged on discrete portions of the circuit board 22, such that when the light sources 30 are activated to emit light, the emitted light forms the illuminated pattern 132. The arrangement of the light sources 30 may be advantageous to produce a distinct and/or discrete illuminated pattern 132.

The circuit board 22 may be a printed circuit board or other type of circuit. The circuit board 22 may be a rigid or flexible circuit. Additionally, the circuit board 22 may withstand higher heat and/or temperatures, which may be produced by the light sources 30. A capacity of the circuit board 22 to withstand higher temperatures may be advantageous for the functionality of the circuit board 22 when the plurality of light sources 26 are activated and, accordingly, producing heat. The top surface 78 of the circuit board 22 may be substantially flat to accommodate the plurality of light sources 26.

Figure 3A:
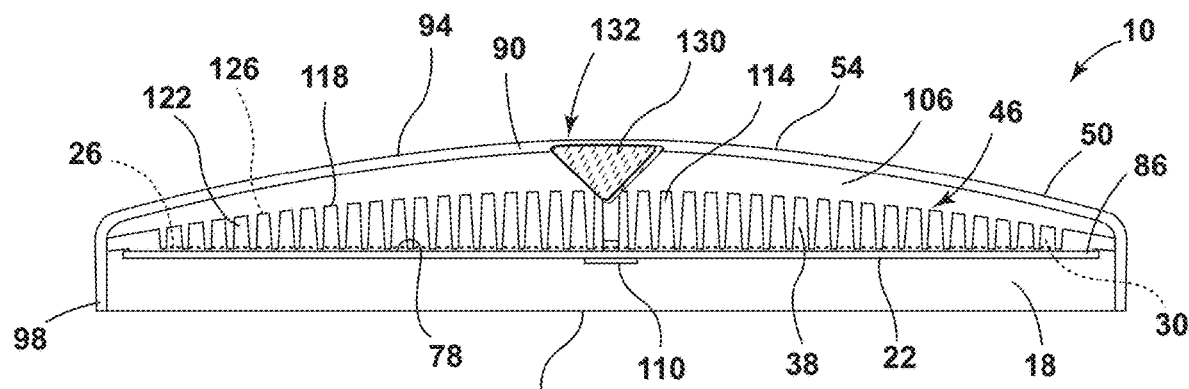
FIG. 3A is a cross-sectional view of the badge of FIG. 1 taken along line

Referring now to FIG. 3A, the housing 50 is disposed over the light sources 30 and is coupled to the peripheral portion 86 of the circuit board 22. According to various aspects, the housing 50 includes the viewable portion 54 generally on a forward portion 90 of the badge 10. The housing 50 may partially or entirely cover the light sources 30 and/or the circuit board 22. In various examples, the housing 50 includes indicia or an insignia. Additionally or alternatively, the housing 50 may define the indicia or insignia. In such examples, the housing 50 may be disposed over the light sources 30, but may not be disposed over portions of the circuit board 22 without light sources 30. As such, the shape of the housing 50 may not directly correspond to the shape of the circuit board 22. However, the housing 50 and the circuit board 22 may have a substantially similar shape without departing from the teachings herein. The housing 50 may be constructed from a rigid material, such as, but not limited to, a polymeric material. Further, the housing 50 may be light transmissible, such that light emitted from the light sources 30 may be transmitted through the housing 50. As illustrated, the housing 50 includes an arcuate exterior surface 94. In comparison, the circuit board 22 may be flat and/or substantially linear. In various examples, the viewable portion 54 of the badge 10 includes the arcuate exterior surface 94. The housing 50 may be coupled to the peripheral portion 86 of the circuit board 22. According to various aspects, edges 98 of the housing 50 may extend past the circuit board 22. This configuration may be advantageous for protecting the circuit board 22 from outdoor elements, such as, water, snow, dirt, or the like. Alternatively, the edges 98 of the housing 50 may be disposed on the peripheral portion 86 of the circuit board 22.

Referring to FIGS. 1 and 3A, the circuit board 22 is disposed on the base 18. The base 18 may be constructed from a polymeric material. In various examples, the base 18 may cooperate with the housing 50 to protect the light sources 30 and the circuit board 22 from outdoor elements. Additionally or alternatively, the base 18 may be configured to be mounted to the vehicle 14. The base 18 may form a rear portion 102 of the badge 10 and be configured to be mounted to the grille assembly 70 or another portion of the vehicle 14. The base 18 may align with the edges 98 of the housing 50 to form a continuous surface. The circuit board 22 may be disposed at any angle such that the light sources 30 disposed on the circuit board 22 are positioned towards a selected location. Stated differently, the light sources 30 are disposed rearwardly of and oriented towards the viewable portion 54 of the housing 50.

As illustrated in FIG. 3A, the housing 50 and the circuit board 22 define a cavity 106 therebetween. The cavity 106 has a greater thickness proximate a center portion 110 of the badge 10 relative to the thickness proximate the peripheral portion 86 of the badge 10. Accordingly, the cavity 106 may have a generally parabolic shape defined by the generally linear circuit board 22 and the arcuate exterior surface 94 of the housing 50. The guide member 38 is disposed between the housing 50 and the circuit board 22 within the cavity 106. Stated differently, the guide member 38 is disposed on the top surface 78 of the circuit board 22, and the housing 50 is disposed over the guide member 38. Accordingly, the guide member 38 is disposed over the plurality of light sources 26. The guide member 38 is configured to direct light from the light sources 30 to the viewable portion 54 of the housing 50. According to various aspects, the guide member 38 is constructed of a semi-transparent and/or opaque material such as, for example, plastic materials, acrylic materials, other thermoplastics, or other polymeric materials. The guide member 38 defines a plurality of light guides 46, which includes individual light guides 114. Each light guide 114 may be disposed over a single light source 30. Alternatively, each light guide 114 may be disposed over more than one light source 30. According to various aspects, some light guides 114 may be disposed over a single light source 30 and other light guides 114 may be disposed over more than one light source 30. In various examples, the light guides 114 may correspond with each light source 30 of the first, second, and third pluralities of light sources 26A, 26B, 26C. The light guides 114 may extend differing heights from the circuit board 22 that correspond with the arcuate exterior surface 94 of the housing 50. Stated differently, an end 118 of each light guide 114 is spaced-apart from the housing 50 by a substantially similar distance. As such, the ends 118 of the light guides 114 define a curved outer portion 122 of the guide member 38 that corresponds with the arcuate exterior surface 94 of the housing 50.

The light guides 114 direct the emitted light from each light source 30 towards the housing 50 and reduce a corresponding illuminated portion 130 of the housing 50. Accordingly, each light source 30 may correspond with a discrete illuminated portion 130, which may allow an illuminated pattern 132 to be viewable. The illuminated pattern 132 may include the sequence that the light sources 30 are activated or illuminated (e.g., a pattern of illumination), the sequence that the light sources 30 are deactivated or unilluminated (e.g., a pattern of deactivation), and/or the resulting image produced by the emitted light from the light sources 30. The size and/or shape of each illuminated portion 130 may be controlled by the size and/or shape of an aperture 126 defined by the end 118 of each light guide 114. The distance between the ends 118 of the light guides 114 and the housing 50 may also contribute to the size and/or shaped each illuminated portion 130. Tuning of the illuminated portions 130 corresponding to each light source 30 may be accomplished via a molding modification of the guide member 38 to alter the length of the light guides 114 and/or the size and/or shape of the apertures 126 of the light guides 114. The light guides 114 may be rectangular, tubular, or elliptical shaped or have a discontinuous perimeter. Moreover, the light guides 114 may have uniform thickness or alternatively, vary in thickness.

Figure 3B:
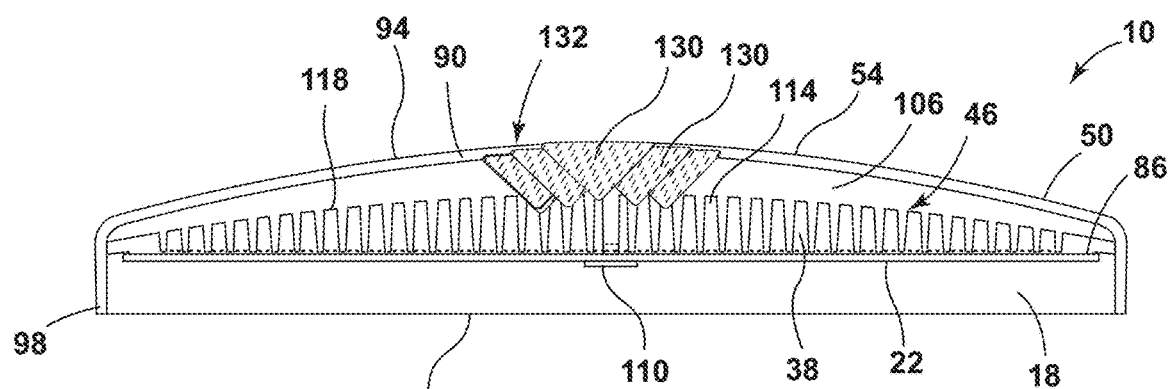
FIG. 3B is a cross-sectional view of the badge of FIG. 1 taken along line
Figure 3C:
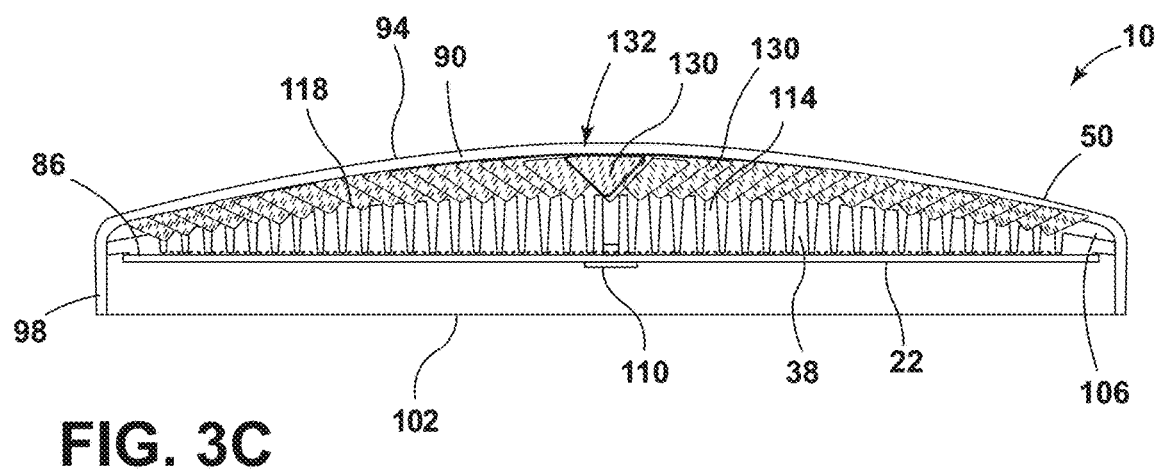
FIG. 3C is a cross-sectional view of the badge of FIG. 1 taken along line

Referring to FIGS. 3A-3C, the light sources 30 within the badge 10 may sequentially illuminate to provide a distinct styling element of the vehicle 14. According to various aspects, the light sources 30 disposed proximate the center portion 110 of the circuit board 22 may be illuminated first, as illustrated in FIG. 3A. The light sources 30 may be sequentially activated and illuminate in an outward direction from the center portion 110, as illustrated in FIG. 3B. Once the light sources 30 disposed proximate to the center portion 110 are illuminated, the adjacent light sources 30 may be activated. The light sources 30 are continually activated until a selected number or all of the light sources 30 are activated to produce the illuminated pattern 132 on the badge 10, as illustrated in FIG. 3C.

Figure 4:
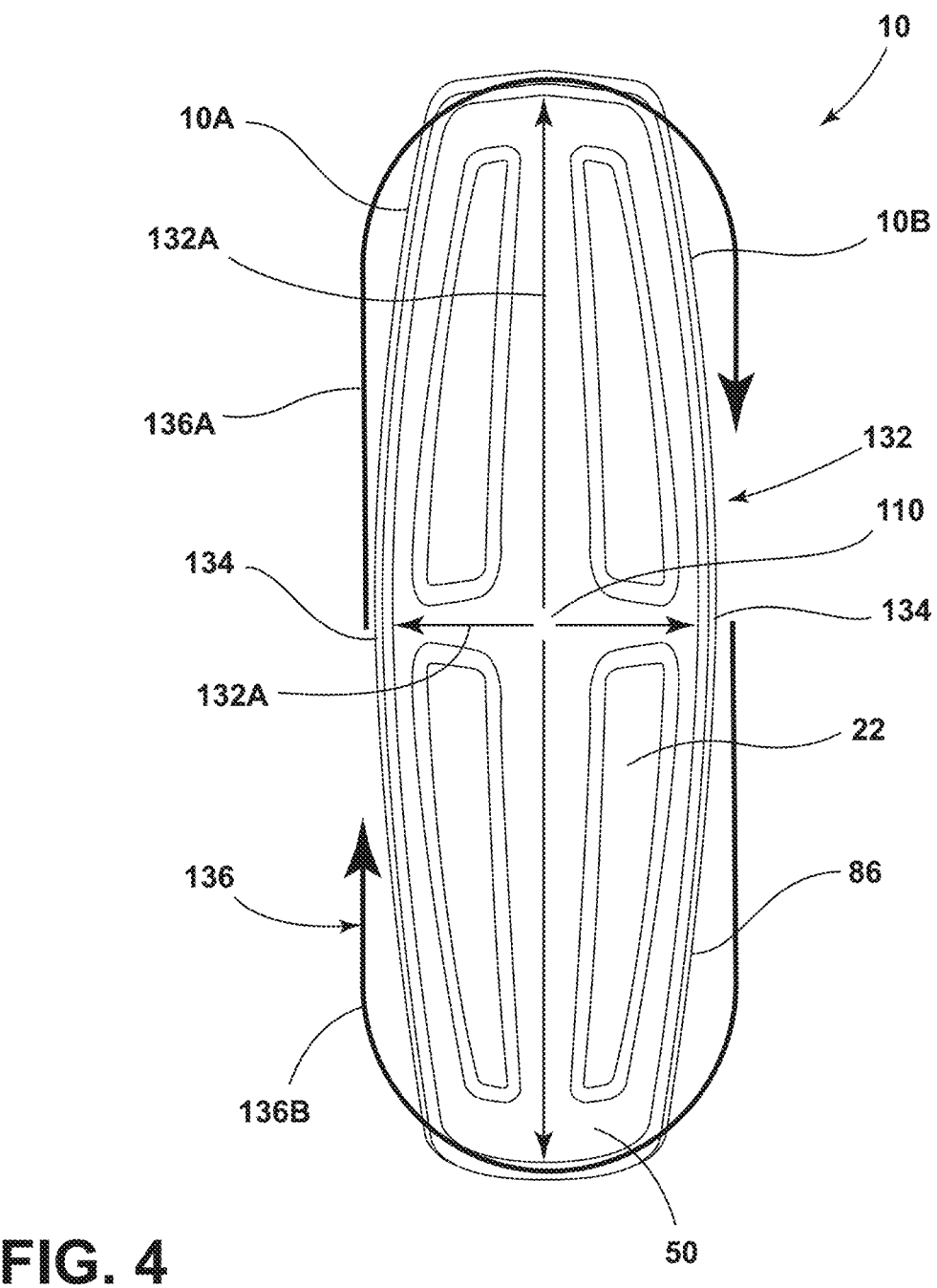
FIG. 4 is a front view of a vehicle badge, according to at least one example.

Referring to FIGS. 2 and 4, in a specific example, the light sources 30 of the badge 10 can be selectively activated and/or illuminated in a sequence to produce the illuminated pattern 132. The light sources 30 of the first and second pluralities of light sources 26A, 26B disposed proximate the center portion 110 of the circuit board 22 may be illuminated first. As such, the center portion 110 of the badge 10 may be illuminated first. The light sources 30 of the first and second pluralities of light sources 26A, 26B may be sequentially illuminated in a synchronized manner. In such examples, an inward-to-outward (e.g., outwardly directed) illuminated pattern 132A is produced by the badge 10. The first plurality of light sources 26A may sequentially illuminate in a first direction (e.g., upwards) from the center portion 110 and in a second opposing direction (e.g., downwards) from the center portion 110 simultaneously. The second plurality of light sources 26B may sequentially illuminate in a first direction (e.g., left) and a second opposing direction (e.g., right) simultaneously. Additionally or alternatively, the first and second pluralities of light sources 26A, 26B may each illuminate in a first direction and then after illuminated in a second direction to produce a different illuminated pattern 132. According to various aspects, the first and second pluralities of light sources 26A, 26B may be simultaneously sequentially illuminated, however, the first and second pluralities of light sources 26A, 26B may be separately illuminated without departing from the teachings herein. In various examples, the light sources 30 of the first and/or second pluralities of light sources 26A, 26B may be sequentially illuminated in an inwards-to-outwards (e.g., inwardly directed) illuminated pattern 132A. In such examples, the outermost light sources 30 are illuminated first and the remaining light sources 30 are sequentially illuminated until the innermost light sources 30 disposed proximate the center portion 110 are illuminated. Alternatively, the light sources 30 may be sequentially illuminated from one side to another, such as, for example, left-to-right, right-to-left, top-down, bottom-up, and/or combinations thereof. Other illuminated patterns 132 are also contemplated without departing from the teachings herein. Further, the first and second pluralities of light sources 26A, 26B may sequentially illuminate in a same light pattern or a different light pattern.

The third plurality of light sources 26C may be sequentially illuminated before, after, or between the illumination of the first and second pluralities of light sources 26A, 26B. The third plurality of light sources 26C may be sequentially illuminated from a start point 134 to produce a ring-shaped illuminated pattern 136. The start point 134 is illustrated in FIGS. 2 and 4 as proximate an outermost light source 30 of the second plurality of light sources 26B such that the ring-shaped illuminated pattern 136 starts on a left side 10A of the badge 10. However, the start point 134 can correspond to any of the light sources 30 within the third plurality of light sources 26C. The light sources 30 may sequentially illuminate in a single direction around the peripheral portion 86 of the badge 10. Alternatively, the light sources 30 may be sequentially illuminated in opposing directions from the start point 134 until the selected and/or all the light sources 30 of the third plurality of light sources 26C are illuminated. Alternatively, the ring-shaped illuminated pattern 136 may be formed by two half-ring illuminated patterns 136A, 136B. In such examples, there may be two opposing start points 134, illustrated proximate the outermost light sources 30 of the second plurality of light sources 26B on left and right sides 10A, 10B of the badge 10. The light sources 30 may be sequentially illuminated in opposing directions towards the other starting point 134 until a selected number of light sources 30 or the entire third plurality of light sources 26C is illuminated. Alternatively still, the two start points 134 may correspond to any one or more light source 30 of the third plurality of light sources 26C.

Figure 5:
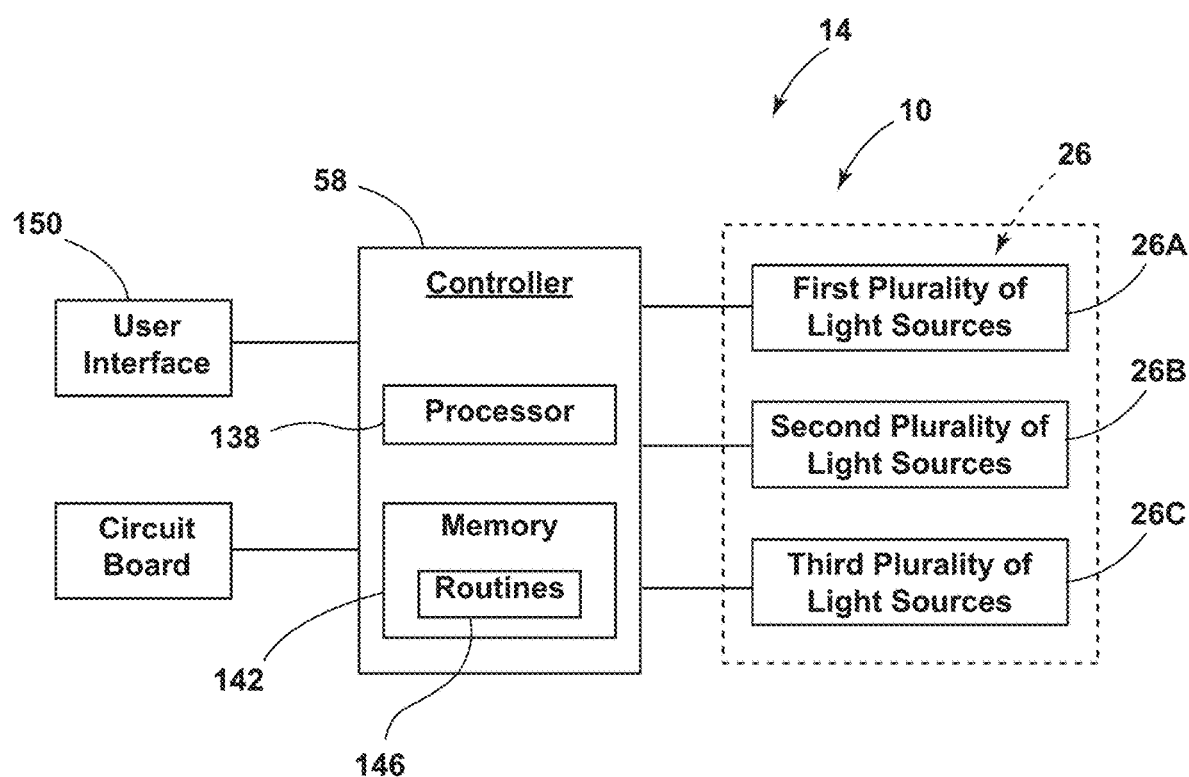
FIG. 5 is a box diagram of a vehicle including a vehicle badge, according to at least one example.

Referring to FIGS. 2, 3A, and 5, each light source 30 of the first, second, and third pluralities of light sources 26A, 26B, 26C may direct light through the light guides 114 to a predefined illuminated portion 130 of the viewable portion 54 of the housing 50. The light guides 114 may hinder and/or prevent light directed from one light source 30 from bleeding into proximately disposed light guides 114 and/or the illuminated portions 130 of proximately disposed light sources 30. There may be a delay of a predefined amount of time between sequentially illuminated light sources 30 to produce a discrete illumination of each light source 30 and therefore a discrete illuminated pattern 132. The time delay may be advantageous to emphasize the illuminated pattern 132, such that the light sources 30 are not illuminated too quickly for an observer to distinguish the illuminated pattern 132. Further, there may be a delay of a same or different predefined amount of time between the illumination of the first, second, and/or third pluralities of light sources 26A, 26B, 26C to further distinguish the illuminated pattern 132. Once illuminated, the light sources 30 may remain activated (e.g., in an illuminated state) until deactivated (e.g., to an unilluminated state) by a controller 58. The light sources 30 may be deactivated simultaneously or may be deactivated in a pattern. The pattern in which the light sources 30 are deactivated may correspond to the pattern in which the light sources 30 were illuminated, or alternatively, the light sources 30 may be deactivated in a different pattern.

According to various aspects, the controller 58 includes a processor 138, a memory 142, and other control circuitry. Commands or routines 146 are stored in the memory 142 and executable by the processor 138. The routines 146 may include one or more algorithms relating to the sequential illuminated pattern 132 of the light sources 30. Stated differently, the routines 146 may relate to the pattern in which the light sources 30 are illuminated and the final illuminated image. The controller 58 may be an independent component that is disposed within the badge 10. Alternatively, the controller 58 may be disposed within the vehicle 14 and may be configured to control illumination of the badge 10 and/or any other vehicle 14 function. Additionally, the badge 10 may include more than one controller 58 and/or may be in communication with more than one controller 58. The controller 58 may individually control each light source 30 of the first, second, and third pluralities of light sources 26A, 26B, 26C. Accordingly, the controller 58 may be operably coupled to and selectively illuminate each light source 30. The light sources 30 may be illuminated individually or more than one light source 30 may be illuminated simultaneously to define the illuminated pattern 132. Moreover, the controller 58 may sequentially illuminate the light sources 30 to define the selected illuminated pattern 132. According to various aspects, the badge 10 may be operably coupled with a user-interface 150. The user-interface 150 may be configured, such that a user may control the wavelength of emitted light and/or the illuminated pattern 132.

Figure 6:
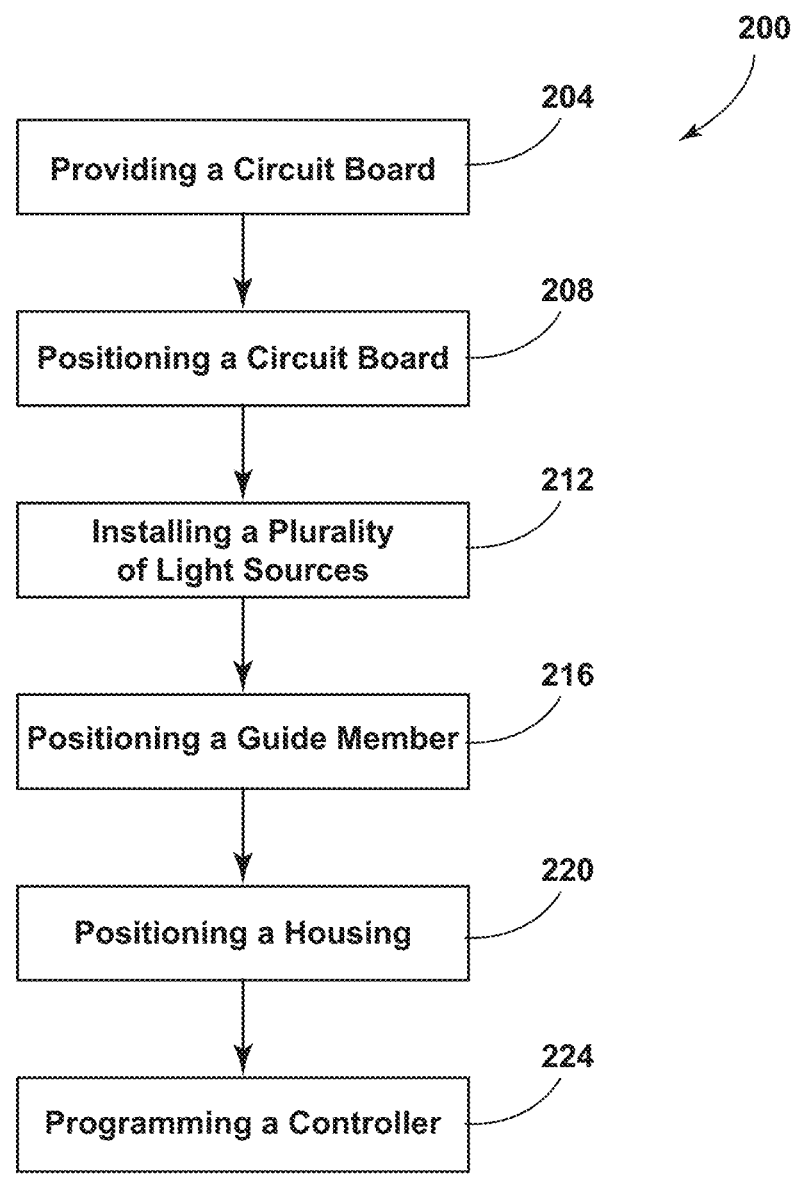
FIG. 6 is a flow diagram of a method of assembling a badge of a vehicle, according to at least one example.

Referring to FIG. 6, and with further reference to FIGS. 1-5, a method 200 of assembling the badge 10 for the vehicle 14 includes a step 204 of providing the circuit board 22. A next step 208 may include positioning the circuit board 22 on the base 18. The circuit board 22 may be adhered or otherwise coupled to the base 18. In various examples, the circuit board 22 may be mechanically fastened to the base 18.

A next step 212 includes installing the plurality of light sources 26 on the circuit board 22 in the pattern 34. In various examples, the pattern 34 may be defined by the first, second, and third pluralities of light sources 26A, 26B, 26C. The first plurality of light sources 26A may be installed in the first direction pattern 74. The second plurality of light sources may be installed in the second direction pattern 82. Further, the third plurality of light sources 26C may be installed in the peripheral pattern 84. The light sources 30 may be adhered, coupled, or otherwise disposed on the circuit board 22.

A step 216 may include positioning the guide member 38 over the light sources 30. The guide member 38 may be adhered or otherwise coupled to the circuit board 22. The step 216 may also include molding the guide member 38. The guide member 38 may define the plurality of light guides 46 with individual light guides 114 having selected shapes and/or sizes to produce the selected lighting effect and/or illuminated pattern 132. The step 216 may also include tuning the light guides 114 through adjustments during the molding process to produce the selected light guide 114 shape and/or size. Additionally or alternatively, the step 216 may also include positioning the light guides 114 over the corresponding light sources 30 of the plurality of light sources 26.

A step 220 includes positioning the housing 50 over the guide member 38. The step 220 may also include positioning the housing 50 over the light sources 30 and/or the circuit board 22. Additionally or alternatively, the step 216 may include providing the base 18 and coupling the housing 50 to the base 18. The housing 50 may be coupled to the base 18 via sonic welding, laser welding, vibration welding, injection molding, or any other similar process. Alternatively, the housing 50 may be coupled to the base 18 via adhesives.

In a next step 224, the controller 58 may be programmed to selectively activate and/or illuminate each light source 30 of the plurality of light sources 26 to produce a predefined illuminated pattern 132. The programming may be stored in the memory 142 and executed by the routines 146. The predefined illuminated pattern 132 may include sequentially illuminating the light sources 30 of the first, second, and third pluralities of light sources 26A, 26B, 26C. The predefined illuminated pattern 132 may also include the sequential lighting between the first plurality of light sources 26A, the second plurality of light sources 26B, and the third plurality of light sources 26C. The step 220 may also include a user programming the controller 58 to display the selected illumination pattern 132 input via the user-interface 150.

Use of the present disclosure may provide for a variety of advantages. For example, the sequential lighting of the light sources 30 may produce an aesthetically appealing illuminated pattern 132 on the badge 10 of the vehicle 14. Additionally, the guide member 38 defining the light guides 114 directs the light from each light source 30 to a predefined illuminated portion 130 of the housing 50. The light guides 114 may separate the light from each light source 30 to produce a distinct illuminated pattern 132. The illuminated pattern 132 may be distinguishable between various predefined or selected illuminated patterns 132. Further, the controller 58 may selectively illuminate the light sources 30 of the badge 10 to provide a variety of illuminated patterns 132. Additional benefits or advantages of using this device may also be realized and/or achieved.

According to various examples, vehicle badge includes a base and a circuit board disposed on the base. A plurality of light sources is disposed on the circuit board. The plurality of light sources defines a pattern. A guide member is disposed over the plurality of light sources. The guide member defines a plurality of light guides. A housing has a viewable portion and is disposed over the guide member. The guide member directs light from the plurality of light sources to the housing. A controller is operably coupled to each light source of the plurality of light sources. The controller selectively illuminates each light source of the plurality of light sources. Embodiments of the present disclosure may include one or a combination of the following features:

- a viewable portion of a housing includes an arcuate exterior surface;
- a guide member defines a curved outer portion that corresponds with an arcuate exterior surface of the housing;
- each light guide of a plurality of light guides corresponds with a light source of a plurality of light sources;
- a controller selectively activates each light source sequentially to define an illuminated pattern;
- a controller simultaneously activates more than one light source of a plurality of light sources disposed proximate a center portion of a circuit board, and the controller sequentially illuminates light sources of the plurality of light sources to define an illuminated pattern; and
- a pattern defined by the plurality of light sources includes a logo.

According to various examples, a badge for a vehicle includes a base and a printed circuit board disposed on the base. A first plurality of light sources is arranged in a first direction pattern along the printed circuit board. A second plurality of light sources is arranged in a second direction pattern along the printed circuit board. A third plurality of light sources is disposed proximate a peripheral portion of the printed circuit board. Embodiments of the present disclosure may include one or a combination of the following features:

- a first direction pattern extends in a longitudinal direction across a printed circuit board;
- a second direction pattern extends in a lateral direction across a printed circuit board;

a second direction pattern is substantially perpendicular to a first direction pattern;
a housing having a viewable portion and coupled to a peripheral portion of a printed circuit board;
a guide member defining a plurality of light guides that correspond with the first, second, and third pluralities of light sources;
a controller that selectively illuminates each light source of first, second, and third pluralities of light sources;
a controller selectively illuminates each light source in an illuminated pattern;
a controller sequentially illuminates each light source of first and second pluralities of light sources such that the first and second pluralities of light sources are illuminated in an outward light pattern from a center portion a the printed circuit board to a peripheral portion of the printed circuit board; and
a controller sequentially illuminates each light source of a third plurality of light sources such that light sources are illuminated in a ring-shaped illuminated pattern.

According to various examples, a method of assembling a badge for a vehicle includes providing a circuit board and installing a plurality of light sources on the circuit board in a pattern. A guide member is positioned over the plurality of light sources. The guide member defines a plurality of light guides that corresponds with the plurality of light sources. A housing is positioned over the guide member. A controller is programmed to selectively illuminate each light source of the plurality of light sources in a predefined illuminated pattern. Embodiments of the present disclosure may include one or a combination of the following features:
positioning the circuit board on a base; and
a controller is programmed to sequentially illuminate light sources of the plurality of light sources.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle badge, comprising:
a base;
a circuit board disposed on the base;

a plurality of light sources disposed on the circuit board, wherein the plurality of light sources defines a pattern;

a guide member disposed on the circuit board and over the plurality of light sources, wherein the guide member defines a plurality of light guides wherein each light source of the pluralities of light sources aligns with an individual light guide;

a housing having a viewable portion that defines an arcuate exterior surface, the housing disposed over the guide member, wherein the guide member directs light from the plurality of light sources to the housing, and wherein the plurality of light guides extend different distances from the circuit board to define a curved outer portion that corresponds with the arcuate exterior surface; and a controller operably coupled to each light source of the plurality of light sources, wherein the controller selectively illuminates each light source of the plurality of light sources.

2. The vehicle badge of claim 1, wherein the plurality of light guides is arranged over the circuit board, and wherein the light guides disposed on a central portion of the circuit board extend a greater distance from the circuit board than the light guides disposed adjacent to a peripheral portion of the circuit board.

3. The vehicle badge of claim 1, wherein each light guide of the plurality of light guides corresponds with a light source of the plurality of light sources.

4. The vehicle badge of claim 1, wherein the controller selectively activates each light source of the plurality of light sources sequentially to define an illuminated pattern.

5. The vehicle badge of claim 1, wherein the controller simultaneously activates more than one light source of the plurality of light sources disposed proximate a center portion of the circuit board, and further wherein the controller sequentially illuminates light sources of the plurality of light sources to define an illuminated pattern.

6. The vehicle badge of claim 1, wherein the pattern defined by the plurality of light sources includes a logo.

7. A badge for a vehicle, comprising:
a base;
a printed circuit board disposed on the base;
a first plurality of light sources arranged in a first direction pattern along the printed circuit board;
a second plurality of light sources arranged in a second direction pattern along the printed circuit board;
a third plurality of light sources disposed proximate a peripheral portion of the printed circuit board; and
a guide member defining light guides and coupled to the printed circuit board, wherein the light guides extend different distances from the printed circuit board to define a curved outer portion wherein each light source of the first, second and third pluralities of light sources aligns with an individual light guide.

8. The badge for a vehicle of claim 7, wherein the first direction pattern extends in a longitudinal direction across the printed circuit board.

9. The badge for a vehicle of claim 8, wherein the second direction pattern extends in a lateral direction across the printed circuit board.

10. The badge for a vehicle of claim 7, wherein the second direction pattern is substantially perpendicular to the first direction pattern.

11. The badge for a vehicle of claim 7, further comprising:
a housing having a viewable portion and coupled to the peripheral portion of the printed circuit board, wherein the viewable portion defines an arcuate exterior surface.

12. The badge for a vehicle of claim 11, wherein each light source of the first, second, and third pluralities of light sources aligns with an individual light guide, and wherein the curved outer portion of the guide member corresponds with the arcuate exterior surface of the housing.

13. The badge for a vehicle of claim 7, further comprising:
a controller that selectively illuminates each light source of the first, second, and third pluralities of light sources.

14. The badge for a vehicle of claim 13, wherein the controller selectively illuminates each light source in an illuminated pattern.

15. The badge for a vehicle of claim 7, further comprising:
a controller, wherein the controller sequentially illuminates each light source of the first and second pluralities of light sources such that the first and second pluralities of light sources are illuminated in an outward light pattern from a center portion of the printed circuit board to the peripheral portion of the printed circuit board.

16. The badge for a vehicle of claim 15, wherein the controller sequentially illuminates each light source of the third plurality of light sources such that the light sources are illuminated in a ring-shaped illuminated pattern.

17. A method of assembling a badge for a vehicle, comprising:
providing a circuit board;
installing a plurality of light sources on the circuit board in a pattern;
positioning a guide member over the plurality of light sources, wherein the guide member defines a plurality of light guides;
aligning each light source of the plurality of light sources with an individual light guide of the plurality of light guides;
positioning a housing over the guide member; and
programming a controller to selectively illuminate each light source of the plurality of light sources in a predefined illuminated pattern.

18. The method of claim 17, further comprising:
positioning the circuit board on a base.

19. The method of claim 17, wherein the controller is programmed to sequentially illuminate light sources of the plurality of light sources.

* * * * *